United States Patent [19]

Shinskey

[11] Patent Number: 5,537,388
[45] Date of Patent: *Jul. 16, 1996

[54] METHOD AND APPARATUS FOR CHARACTERIZING AND COMPENSATING FOR NON-LINEAR COMPONENTS

[75] Inventor: Francis G. Shinskey, North Sandwich, N.H.

[73] Assignee: The Foxboro Company, Foxboro, Mass.

[*] Notice: The term of this patent shall not extend beyond the expiration date of Pat. No. 5,341,288,

[21] Appl. No.: 204,745

[22] Filed: Mar. 2, 1994

[51] Int. Cl.$^6$ ................................................. G05B 13/04
[52] U.S. Cl. ..................... 364/551.01; 364/148; 364/158; 364/177
[58] Field of Search .................................... 364/157–159, 364/177, 148, 469, 486, 487, 553, 551; 318/561

[56] References Cited

U.S. PATENT DOCUMENTS

| | | |
|---|---|---|
| Re. 33,267 | 7/1990 | Kraus . |
| 3,515,860 | 6/1970 | Fitzgerald et al. . |
| 3,617,717 | 11/1971 | Smith . |
| 3,671,725 | 6/1972 | Bakke . |
| 3,786,242 | 1/1974 | Brooks . |
| 3,867,712 | 2/1975 | Harthill et al. . |
| 3,876,872 | 4/1975 | Spitz . |
| 3,878,982 | 4/1975 | Hoffman . |
| 3,881,651 | 5/1975 | Wilhelm, Jr. . |
| 3,961,234 | 6/1976 | Chambers et al. . |
| 3,992,616 | 11/1976 | Acker . |
| 3,995,478 | 12/1976 | Wilhelm, Jr. . |
| 4,186,384 | 1/1980 | Acker . |
| 4,346,433 | 8/1982 | Rutleage . |
| 4,441,151 | 4/1984 | Hayashibe . |
| 4,602,326 | 7/1986 | Kraus . |
| 4,654,811 | 3/1987 | Jakubzick . |
| 4,823,055 | 4/1989 | Bowman ................................. 318/314 |
| 4,855,897 | 8/1989 | Shinskey . |
| 4,903,192 | 2/1990 | Saito et al. . |
| 4,959,767 | 9/1990 | Buchner et al. . |
| 5,091,844 | 2/1992 | Waltz . |
| 5,124,626 | 6/1992 | Thoen . |
| 5,150,289 | 9/1992 | Badavas . |
| 5,191,521 | 3/1993 | Brosilow . |
| 5,239,456 | 8/1993 | Badavas et al. . |
| 5,319,539 | 6/1994 | Shinskey . |
| 5,341,288 | 8/1994 | Shinskey ................................. 364/159 |

FOREIGN PATENT DOCUMENTS

| | | |
|---|---|---|
| 0405924 | 6/1989 | European Pat. Off. . |
| 0377913 | 7/1990 | European Pat. Off. . |
| 932461 | 5/1982 | U.S.S.R. . |
| 1012202 | 4/1983 | U.S.S.R. . |

OTHER PUBLICATIONS

Ulery et al., "Software Requirements for Statistical Quality Control", Instrument Society of America, 1986, pp. 821–828.

Badavas et al., "Statistical Process Control Embedded in Open Industrial Systems", Instrument Society of America, 1988, pp. 1299–1310.

(List continued on next page.)

*Primary Examiner*—Emanuel T. Voeltz
*Assistant Examiner*—Craig Steven Miller
*Attorney, Agent, or Firm*—Lahive & Cockfield

[57] ABSTRACT

A method of determining the degree z of a hyperbolic non-linear characteristic, of a process that is controlled by application of a manipulated variable signal thereto for varying a first characteristic thereof, and that generates a controlled variable signal representative of that first characteristic by applying a first pulse to the process by stepping the manipulated variable signal and observing the resultant maximum change in the controlled variable and then applying a second pulse to the process by stepping the manipulated variable in the opposite direction and observing the maximum change in the controlled variable, and using the ratio of the two maxima to determine the non-linear characteristic and make appropriate compensation in the controller.

22 Claims, 10 Drawing Sheets

OTHER PUBLICATIONS

Epperly et al., "Statistical Process Control Integrated with Distributed Control Systems", National Petroleum Refiners Association Computer Conference 1988, pp. 1–15.

MacGregor et al., "On–Line Statistical Process Control", Chemical Engineering Process, 1988, pp. 21–31.

Badavas et al., "Meeting the Challenges of the '90's with the Intelligent Automation Series, Foxboro Co.", Presentation on the I/A Series as Applied to Paper and Pulp Industry (May 1988).

Shinskey, "Process Control Systems", McGraw Hill, 1988, pp. 150–157.

Shinskey, "How Good are our Controllers in Absolute Performance and Robustness?", Measurement & Control, vol. 23, 1990, pp. 114–121.

Shinskey, "Putting Controllers to the Test", Chemical Engineering, 1990, pp. 96–106.

Shinskey, "Absolute Performance and Robustness Measures . . . ," Proceedings: 46 Annual Symposium on Instrumentation . . . , 1991, pp. 55–63.

Shinskey, "Model Predictors: The First Smart Controllers", I&CS, 1991, pp. 49–52.

Shinskey, "Evaluating Feedback Controllers Challenges Users and Vendors", Control Engineering, 1991, pp. 75–78.

Shinskey, "Controlling Temperature in Batch Reactors", Intech. 1992, pp. 69–72.

European Search Report issued on Dec. 23, 1993 in connection with the foreign application filed on May 26, 1993, Ser. No. 93 304096.6.

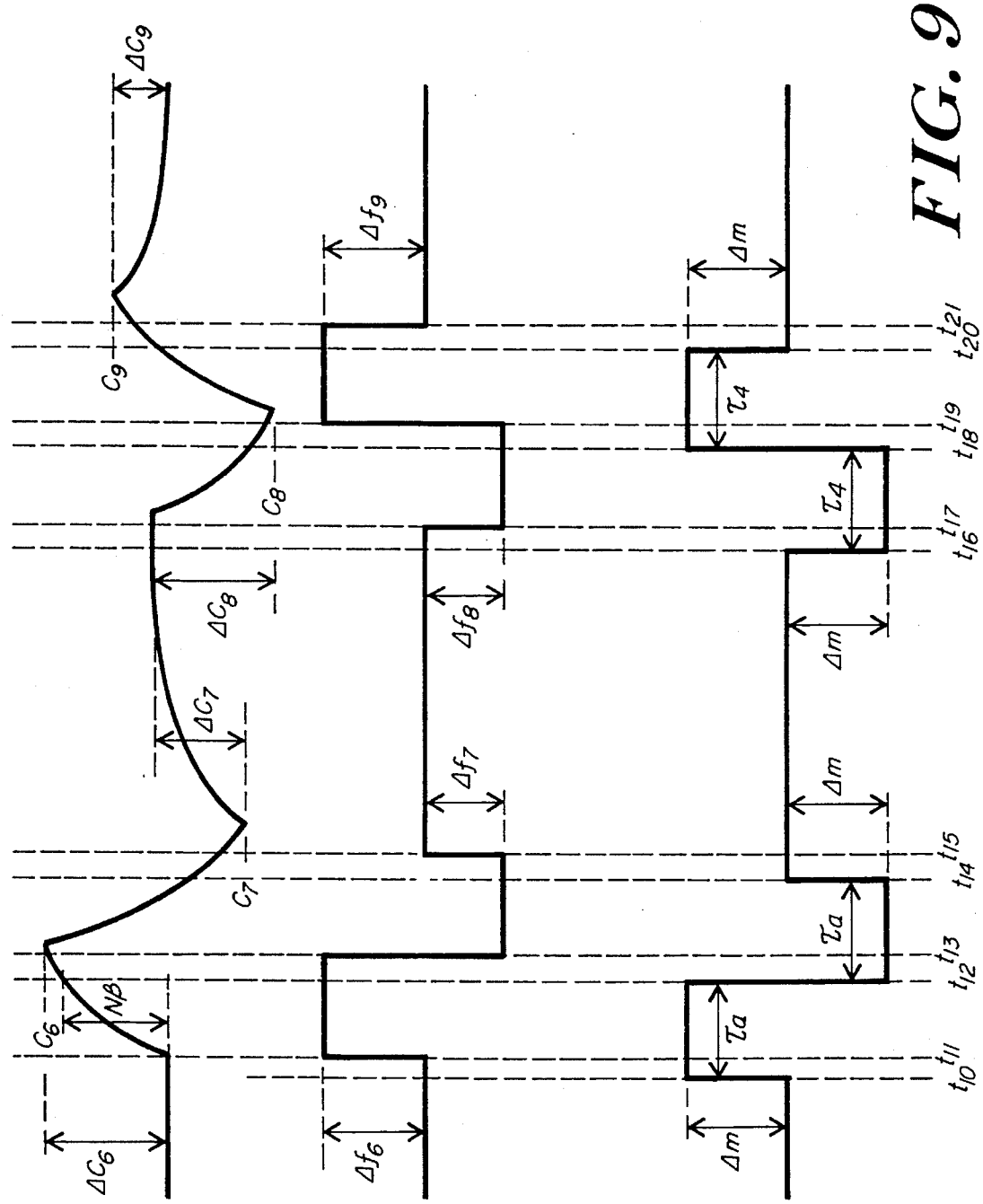

METHOD AND APPARATUS FOR CHARACTERIZING AND COMPENSATING FOR NON-LINEAR COMPONENTS

BACKGROUND OF THE INVENTION

The invention relates to process control and, more particularly, to systems for analyzing processes to determine characteristics such as the non-linear behavior of process components.

Process control refers to a methodology for controlling the operational parameters of a process by monitoring one or more of its characteristics over time. It is used to ensure that the quality and efficiency of a process do not vary substantially during a single run or over the course of several runs. While process control is typically employed in the manufacturing sector, it also has application in service industries.

A process control unit, or "controller," typically operates by comparing values of a process characteristic—referred to as the controlled variable—with a target value to determine whether the process is operating within acceptable bounds. For example, in a process in which fluid flows at a constant rate from a tank that is continuously filled to constant volume, a controller monitors the liquid level and, if necessary to prevent the tank from running dry or overflowing, adjusts an inlet valve to increase or restrict inflow to the tank.

Another example is a process for maintaining a constant temperature in a room or building. In such a process the controller adjusts a thermostat to compensate for changes in heat flow caused by factors such as a rise or drop in the ambient temperature outside the building, or a sudden increase or decrease of the number of people in the building.

Process control systems are generally composed of transducers, controllers, and controllable components (e.g., valves, thermostats and the like). These elements are typically arranged in feedback loops that are well known in the art.

To simplify design problems, process control system designers generally assume that controllable components are linear. However, many real-world components actually behave according to non-linear functions. Further, even linear components can sometimes behave according to non-linear functions when they are installed in process control systems and are subject to well known phenomena such as "variable pressure drop." Ignoring these inherent non-linearities results in undesired error in the process control.

Once a controllable component is installed in a process control system, it is desirable to characterize the non-linearity of the component, at least in a neighborhood about some nominal operating point. As I described in F. G. SHINSKEY, PROCESS CONTROL SYSTEMS (3rd ed. 1988) ch. 2, it is a good approximation to characterize the non-linear behavior of a controllable component as belonging to one of a family of hyperbolic curves having the equation $$f = \frac{x}{z + (1-z)x/100}$$

where f represents the component's output (expressed in percent), x represents the component's input (expressed in percent), and z is a parameter that characterizes the particular component's non-linearity.

This family of curves can be thought of as a universal characterizer since they provide a generic shape indicative of the typical behavior of non-linear controllable components. However, in the current state of the art there is no simple method for determining a value for the parameter, z, that will accurately characterize a particular controllable component.

Once a controllable component's non-linearity has been characterized, it is desirable to compensate for that non-linearity. Further, since controllers are generally designed to control linear components, it is desirable to compensate for the non-linearity so that standard linear control can be applied to the non-linear controllable component.

While many useful components exhibit compensatable non-linear behavior, others are simply defective. Some defective controllable components exhibit a form of behavior known as "dead-band" which is well known in the art. Rather than attempting to characterize and compensate for their defective behavior, it is preferable to identify such components and replace them.

In view of the foregoing, an object of the invention is to provide improved methods and apparatus for characterizing and compensating for non-linear components.

More particularly, an object of the invention is to provide a such methods and apparatus for compensating for (i.e., linearizing) non-linear components in a process control system.

A further object of the invention is to provide such methods and apparatus for determining a value of the parameter, z, that will accurately characterize the non-linearity of a controllable component.

Yet another object of the invention is to provide a method and apparatus for identifying controllable components of a process control system that exhibit deadband.

SUMMARY OF THE INVENTION

The aforementioned objects are achieved by the invention which provides, in one aspect, a method of determining a non-linear characteristic, z, of a self-regulating process. That method includes the steps of applying two pulses, of the same height and duration, to the process via the controller output, known as the manipulated variable.

The first pulse is applied to the process by incrementing the manipulated variable stepwise from an original value, $m_0$, a predetermined amount, $\Delta m$, which causes the controlled variable signal to move from its original value, $c_0$. The controlled variable is monitored during this pulse to determine a time interval, $\tau_a$, defined as the length of time between the instant the manipulated variable is incremented and the instant that the controlled variable signal changes from its original value by a predetermined amount, NB. The value of $\tau_a$, measured during the first pulse, is later used to determine the length of the second pulse.

At a time $\tau_a$ after the beginning of the first pulse, the method calls for decrementing the manipulated variable signal stepwise to its original value, thus ending the first pulse. This eventually causes the controlled variable to decay toward its original value. The controlled variable is monitored during this step to determine the difference between its initial value, $c_0$, and the maximal value achieved by that variable after the manipulated variable has been decremented. That difference is referred to as $\Delta c_1$.

The method according to this aspect of the invention then calls for applying the second pulse to the process by decreasing the manipulated variable signal stepwise from the original value, $m_0$, by the predetermined amount $\Delta m$. The second pulse is applied after the controlled variable has returned to its original value (following the procedure described in the previous paragraph) to cause that variable to, again, change from its original value.

At a time $\tau_a$ later, the manipulated variable is returned stepwise to its original value, $m_0$, thus ending the second pulse and eventually causing the controlled variable to return to its original value. After the end of the second pulse, the controlled variable is monitored to determine a difference, $\Delta c_2$, between the value $c_0$ and value of the controlled variable that is maximally distant from the initial value.

According to this aspect of the invention, the non-linearity, z, of the process is determined as a function of the distances, $\Delta c_1$ and $\Delta c_2$.

In another aspect of the invention, a method as described above includes the additional step of estimating the non-linearity, z, as a function of a mathematical expression $$z = \frac{v(a-b)+b-d}{vd(b-a)-a(b-d)}$$

where, $a = \frac{100}{m_0 - \Delta m} - 1, b = \frac{100}{m_0} - 1,$ $d = \frac{100}{m_0 + \Delta m} - 1, v = \frac{\Delta c_1}{\Delta c_2}$ In still another aspect, the invention provides a method for determining a non-linear characteristic, z, of a self-regulating process by applying a first pulse to the process in the manner described above and responding to the controlled variable signal reaching a steady state value other than the original value, $c_0$, by generating a signal indicating the presence of dead-band in the process.

Other aspects of the invention provide a method for determining a non-linear characteristic, z, of a non-self-regulating process. This method includes the step of applying a first pulse of duration $\tau_a$ to the process via the manipulated variable, where the time interval $\tau_a$ is measured as described above in connection with self regulating processes. The controlled variable is monitored to determine a difference between its initial value, $c_0$, and a steady state value assumed by the controlled variable after the conclusion of the first pulse. This difference is referred to as $\Delta c_1$.

The method then calls for applying a second pulse to the process by decrementing stepwise the manipulated variable by an amount $\Delta m$ for an interval of length $\tau_a$, as discussed above. After the conclusion of the second pulse, the controlled variable is monitored to determine the difference between the steady state assumed by the controlled variable after the second pulse and the steady state assumed after the first pulse. This difference is referred to as $\Delta c_2$.

According to this aspect of the invention, the non-linearity, z, of the process is determined as a function of the differences, $\Delta c_1$ and $\Delta c_2$.

In still another aspect of the invention, a method as described above for non-self-regulating processes includes the additional step of estimating the non-linearity, z, as a function of a mathematical expression $$z = \frac{v(a-b)+b-d}{vd(b-a)-a(b-d)}$$

where, $a = \frac{100}{m_0 - \Delta m} - 1, b = \frac{100}{m_0} - 1,$

-continued $d = \frac{100}{m_0 + \Delta m} - 1, v = \frac{\Delta c_1}{\Delta c_2}$ In another aspect, the invention provides a method for determining a non-linear characteristic, z, of a non-self-regulating process by applying a first pulse to the process in the manner described above and responding to the controlled variable failing to reach a steady state after the conclusion of the first pulse by generating a signal indicating the presence of dead-band in the process.

In yet another aspect, the invention provides a method for determining a non-linear characteristic, z, of a self-regulating process by applying two doublet pulses to the process via the manipulated variable. The first doublet pulse is applied to the process by increasing the manipulated variable by an amount $\Delta m$. The length of time interval $\tau_a$ is defined, as described above, as the time between the beginning of the first doublet pulse and the time that the controlled variable changes from its initial value, $c_0$, by an amount NB. After the controlled variable changes by the amount NB, this method calls for beginning the second half of the first doublet pulse by decreasing the manipulated variable by an amount $2\Delta m$. At a time $\tau_a$ after the beginning of the second half of the first doublet pulse, the manipulated variable is then incremented by an amount $\Delta m$ thus ending the first doublet pulse.

The method according to this aspect of the invention calls for monitoring the controlled variable during the second half of the first doublet pulse to measure, $c_6$, the value reached by the controlled variable during the second half of the first doublet pulse maximally distant from the initial value, $c_0$. It also calls for monitoring the controlled variable in the period beginning at the end of the first doublet pulse and ending when the controlled variable returns to its original value, $c_0$, to measure $c_7$, the value attained by the controlled variable maximally distant from the initial value.

The method according to this aspect then calls for applying a second doublet pulse to the process. After the controlled variable returns to its initial value, the manipulated variable is decreased by an amount $\Delta m$. At a time $\tau_a$ after this decreasing, the manipulated variable is increased by an amount $2\Delta m$ thus beginning the second half of the second doublet pulse. At a time $\tau_a$ after the beginning of the second half of the second doublet pulse, the manipulated variable is decreased by an amount $\Delta m$, thus ending the second doublet pulse.

This method calls for monitoring the controlled variable during the second half of the second doublet pulse to measure $c_8$, the value attained by the controlled variable maximally distant from the initial value, $c_0$. This method also calls for monitoring the controlled variable during the period beginning at the end of the second doublet pulse and ending when the controlled variable returns to its initial value, $c_0$, for measuring $c_9$, the value attained by the controlled variable during this period maximally distant from the initial value, $c_0$.

According to this aspect of the invention, the non-linearity, z, of the process is then determined as a function of the measured values, $c_6$, $c_7$, $c_8$, and $c_9$.

Still other aspects of the invention provide apparatus operating in accord with the above methodology. These and other aspects of the invention are evident in the description which follows, and in the attached drawings.

BRIEF DESCRIPTION OF THE DRAWINGS

FIG. 9 is a timing diagram for a self-regulating process showing two doublet pulses applied to the process via the manipulated variable according to a preferred method and apparatus of the invention, and the corresponding values of the controlled variable.

DETAILED DESCRIPTION OF THE ILLUSTRATED EMBODIMENT

Figure 1:
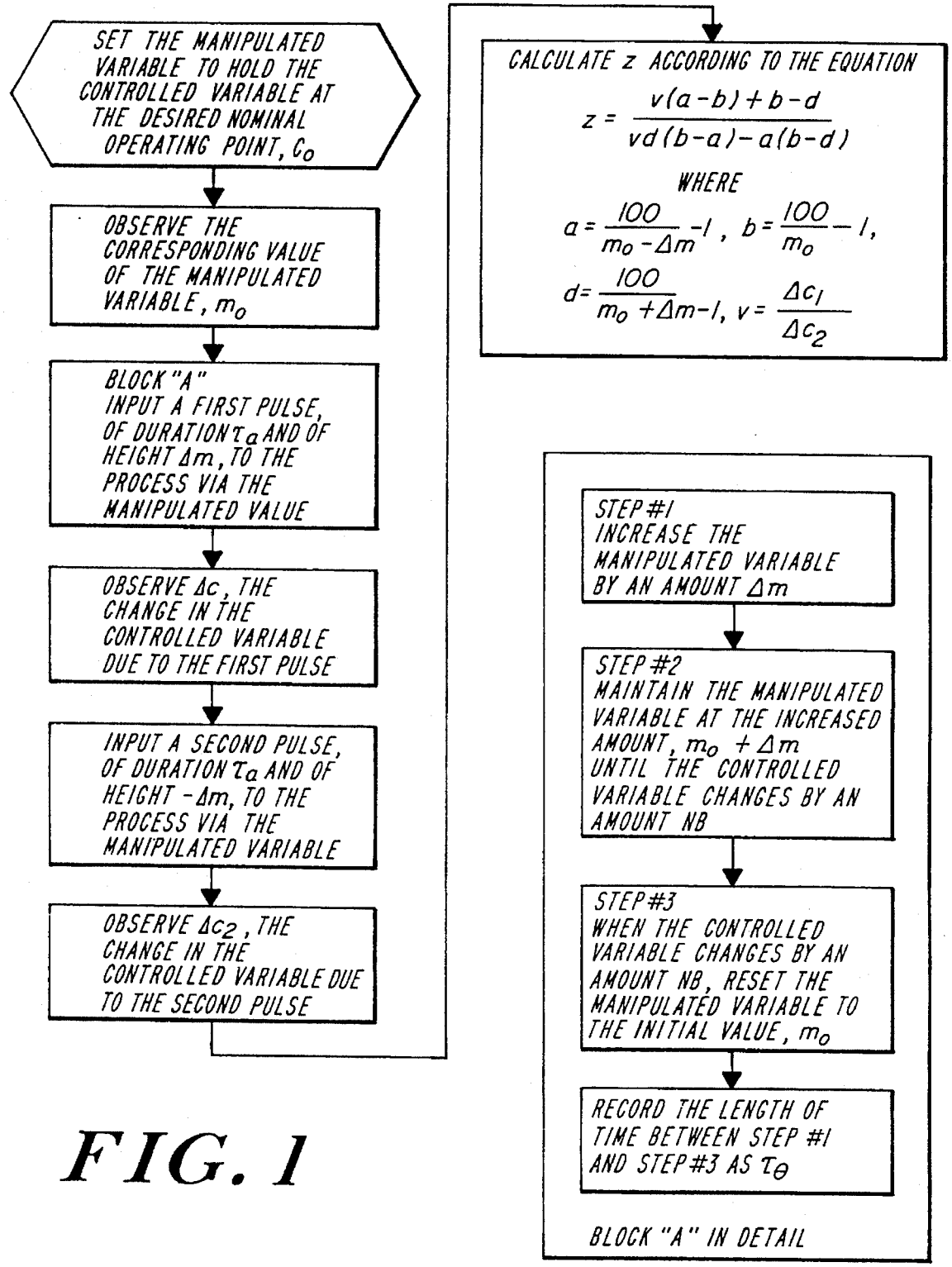
FIG. 1 is a flow chart that illustrates a preferred method for characterizing a non-linear component of a process according to the invention.

FIG. 1 is a flow chart that illustrates a preferred method for characterizing a non-linear component of a process according to the invention. As the flow chart indicates, the method calls for applying two pulses to the process via the manipulated variable. By observing the changes in the controlled variable, in response to the two pulses, the method can calculate the parameter z, which characterizes the relevant non-linear component. The steps of the method illustrated in FIG. 1 will be described more fully below.

Figure 2:
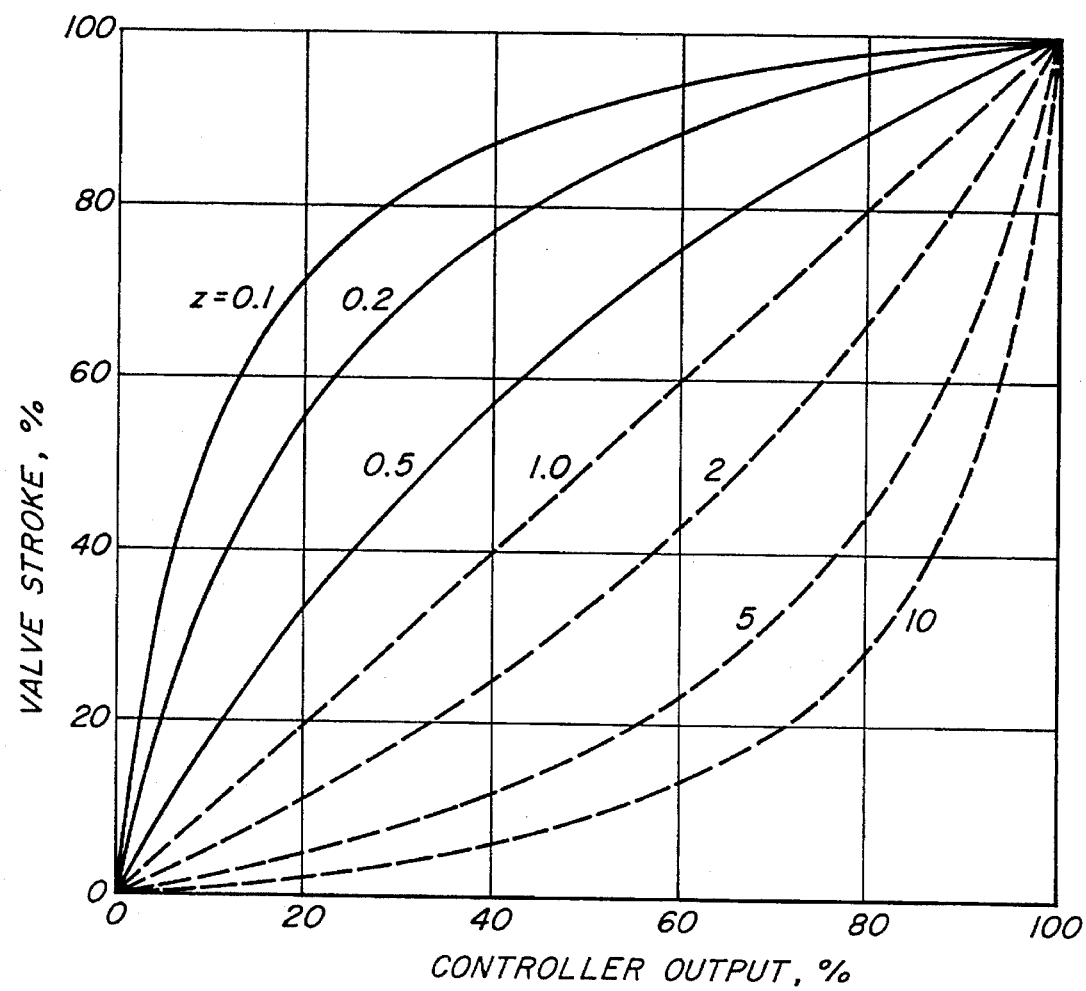
FIG. 2 shows a set of hyperbolic curves that are used to characterize non-linear components in accord with the invention.

FIG. 2 shows the hyperbolic curves used by the method of FIG. 1 for characterizing non-linear components. The curves are described by the equation $$f = \frac{x}{z + (1-z)x/100} \quad (1)$$

In this equation, f represents a controllable component's output (expressed in percent), x represents the component's input (expressed in percent), and z is a parameter that characterizes the particular component's non-linearity.

The goal of the method of FIG. 1 is to select a curve (i.e., choose a value of z) that most closely represents the behavior of the component of interest. Values of z less than one correspond to components with a "quick-opening" characteristic. Values of a greater than one correspond to components with an "equal-percentage" characteristic. z equal to one corresponds to a linear component.

Equation (1) can be rewritten as $$f = \frac{100}{z\left(\frac{100}{x} - 1\right) + 1} \quad (2)$$

As described above, during application of the two pulses, the process can be observed for three different values of the manipulated variable: (a) a nominal operating point, $m_0$; (b) the increased value during the first pulse, $m_0 + \Delta m$; and (c) the decreased value during the second pulse, $m_0 - \Delta m$. Substituting these three values into equation (2) for the variable x to fit the process component's behavior to one of the hyperbolic curves yields $$\frac{\Delta f_1}{\Delta f_2} = \frac{\dfrac{1}{z\left(\dfrac{100}{m_0 + \Delta m} - 1\right) + 1} - \dfrac{1}{z\left(\dfrac{100}{m_0} - 1\right) + 1}}{\dfrac{1}{z\left(\dfrac{100}{m_0 - \Delta m} - 1\right) + 1} - \dfrac{1}{z\left(\dfrac{100}{m_0} - 1\right) + 1}} \quad (3)$$

where $\Delta f_1 = f_1 - f_0$; $\Delta f_2 = f_2 - f_0$; $f_1$ is the output of the controllable component during the first pulse; and $f_2$ is the output of the controllable component in during the second pulse.

Solving equation (3) for z yields $$z = \frac{v(a-b) + b - d}{vd(b-a) - a(b-d)} \quad (4)$$

where, $a = \dfrac{100}{m_0 - \Delta m} - 1, b = \dfrac{100}{m_0} - 1,$ $d = \dfrac{100}{m_0 + \Delta m} - 1, v = \dfrac{\Delta f_1}{\Delta f_2}$ $\Delta f_1$ and $\Delta f_2$ are generally not directly observable, therefore, v can not be directly solved according to equation (4). Typically in a process control system, only the controlled variable is directly observable. However, as will be described in more detail below, $$\frac{\Delta f_1}{\Delta f_2} = \frac{\Delta c_1}{\Delta c_2} \quad (5)$$

where $\Delta c_1$ is the change in the controlled variable due to the first pulse, and $\Delta c_2$ is the change in the controlled variable due to the second pulse. Equation (5) is true for both non-self-regulating and for self-regulating processes. So z can be solved according to equations (4) and (5) for both types of processes.

Figure 3:
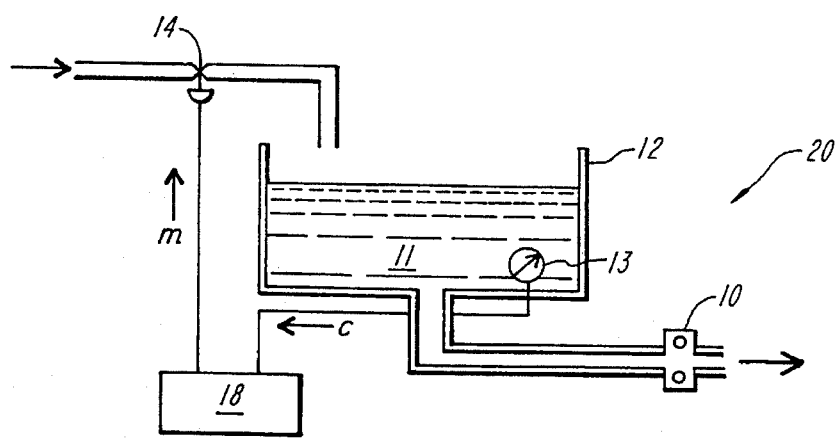
FIG. 3 depicts an exemplary non-self-regulating process amenable to analysis in according to the invention.

FIG. 3 depicts an exemplary non-self-regulating process 20 of the type amenable to analysis by an apparatus constructed and operated in accord with the invention. In FIG. 3 metering pump 10 is designed to deliver a constant flow of fluid 11 from tank 12. Inflow to the tank is controlled at valve 14. A transducer 13 generates a controlled variable signal, c, representative of the level of fluid in the tank 12. A process controller 18 monitors the controlled variable signal and generates a manipulated variable signal, m, which controls the flow of fluid through valve 14.

Process 20 is exemplary of a non-self-regulating process if both the flow entering through valve 14 and the rate at which pump 10 removes fluid from the tank are independant of the liquid level. The nominal operating point is chosen so that when the manipulated variable is set to $m_0$, valve 14 delivers the same flow as pump 10. Therefore, if the process is non-self-regulating, the liquid level in tank 12 will remain constant (or at steady state) whenever the manipulated variable is returned to $m_0$. The fluid level in tank 12 will steadily rise or fall if the value of the manipulated variable is greater than or less than $m_0$, respectively.

Valve 14 is representative of a non-linear component. The methods and apparatus described herein teach how to characterize and compensate for the inherent non-linearity of valve 14. The illustrated process is exemplary only and represents any process amenable to analysis in accord with the teachings herein. Those skilled in the art will appreciate that valve 14 represents any non-linear component that is controlled by a process controller. Moreover, the manipulated and controlled variable signals, m and c, respectively, can be generated in a conventional manner appropriate to the process under analysis.

Figure 4:
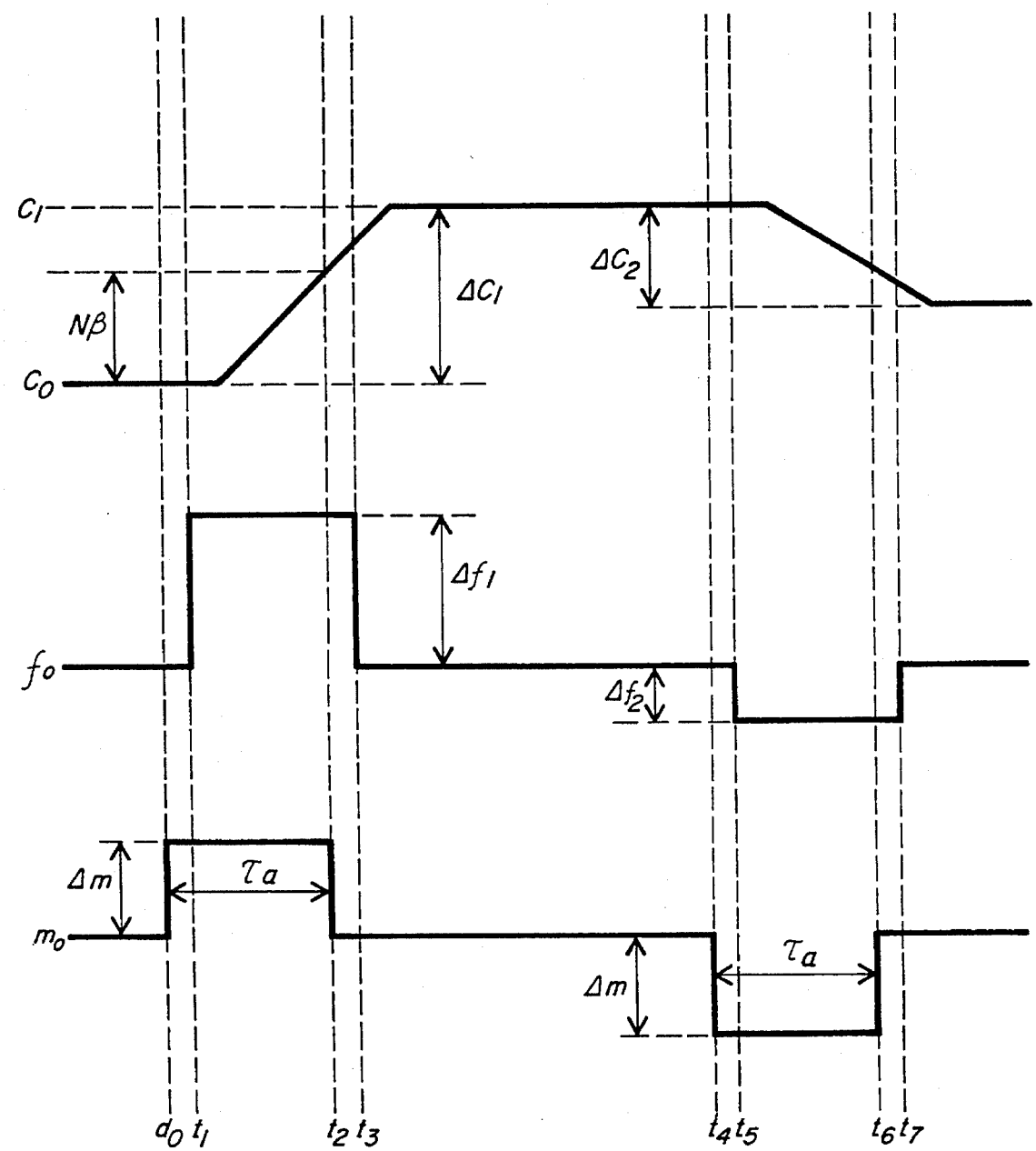
FIG. 4 is a timing diagram for a non-self-regulating process showing two pulses applied to the process, and the parameters that are monitored to characterize a non-linear component according to a preferred method of the invention.

FIG. 4 is a timing diagram, for non-self-regulating process 20, showing a time history of values of the manipulated variable (m) when the controller is operated according to the method of FIG. 1, and the corresponding values of the flow output (f) of valve 14 and the controlled variable (c). Prior to time $t_0$, controller 18 maintains the manipulated variable at an initial value, $m_0$, and this causes the flow output of valve 14 and the controlled variable to remain at initial values, $f_0$ and $c_0$, respectively. Prior to time $t_0$, controller 18 observes and records the value $c_0$.

Beginning at time $t_0$, controller 18 applies a first pulse to the process. At time $t_0$ controller 18 increases the manipulated variable, stepwise, by an amount $\Delta m$. This stepwise increase corresponds to increasing the opening of valve 14. After a short delay, at time $t_1$, this increase in the manipulated variable causes the flow output of valve 14 to increase by an amount $\Delta f_1$. Thus after time $t_1$, the flow into tank 12 (via valve 14) is greater than the flow out of tank 12 (via pump 10). Therefore, the level of fluid in tank 12 begins to rise, and correspondingly the value of the controlled variable also begins to rise. Due to inherent delays in the process, there is some delay after $t_1$ before the controlled variable begins to increase.

Controller 18 maintains the manipulated variable at the increased value until the controlled variable changes by a predetermined amount, NB (corresponding to the fluid level in tank 12 rising by a predetermined amount). The level NB is chosen to insure that the changes in the value of the controlled variable are large enough to be accurately measurable. The choice of NB depends on the output range of transducer 13. NB is perferably in the range of 2 to 10 percent of the output swing of transducer 13. Further, if the controlled variable signal is noisy, NB is preferably twice the noise level.

Once the controlled variable changes by the amount NB, controller 18 records the time as $t_2$, and also records the length of the interval between $t_2$ and $t_0$ as $\tau_a$. At $t_2$ controller 18 resets the manipulated variable, stepwise, to the initial value $m_0$, thus ending the first pulse.

During the first pulse, controller 18 maintains the manipulated variable at the increased value $m_0+\Delta m$, for a duration of $\tau_a$. The change in the controlled variable can be described analytically by the equation $$\Delta c_1 = \Delta f_1 \frac{\tau_a}{\tau_1} \tag{6}$$

where $\tau_1$ is the primary time constant of the process. Related and co-pending United States Patent Application No. 07/889,427, for METHOD AND APPARATUS FOR ANALYZING PROCESS CHARACTERISTICS (Attorney Docket No. FOM-009a) filed May 27, 1992, now U.S. Pat. No. 5,341,228, which is hereby incorporated by reference, teaches a method for identifying process parameters such as $\tau_1$.

$\Delta c_1$ can be observed because $$\Delta c_1 = (c_1 - c_0) \tag{7}$$

where $c_1$ is the peak value attained by the controlled variable in response to the first pulse. Because of delays inherent in the process, the value of the controlled variable continues to increase after $t_2$. A short time after $t_2$, the controlled variable reaches the maximum value, $c_1$, and then remains in a steady state at $c_1$. At this point the process has returned to an equilibrium state; the rate at which fluid is input to tank 12 (via valve 14) equals the rate at which fluid exits the tank (via pump 10). Controller 18 observes and stores the value $c_1$. Controller 18 then calculates (according to equation (7)) and stores the value $\Delta c_1$.

A time $t_4$, an interval of length $\tau_b$ after the conclusion of the first pulse, controller 18 begins to apply a second pulse into the process. The length of interval $\tau_b$ is chosen to be long enough to allow the controlled variable reach a steady state. One preferred choice for $\tau_b$ is $3\tau_1$. At time $t_4$ controller 18 decreases, stepwise, the manipulated variable by the amount $\Delta m$. This stepwise decrease corresponds to reducing the opening of valve 14. Thus after a short delay, at time $t_5$, the flow output from valve 14 decreases by an amount $\Delta f_2$. The flow into tank 12 (via valve 14) is now less than the flow out of tank 12 (via pump 10), therefore the fluid level begins to fall. Controller 18 maintains the manipulated variable at the decreased value $m_0-\Delta m$ for an interval of length $\tau_a$. Then at $t_6$ the controller increases, stepwise, the manipulated variable by an amount $\Delta m$ thus returning the manipulated variable to the initial value $m_0$ and ending the second pulse.

During the second pulse the change in the controlled variable can be described analytically by the equation $$\Delta c_2 = \Delta f_2 \frac{\tau_a}{\tau_1} \tag{8}$$

$\Delta c_2$ can be observed because $$\Delta c_2 = c_2 - c_1 \tag{9}$$

where $c_2$ is the peak value attained by the controlled variable in response to the second pulse. Because of delays inherent in the process, the value of the controlled variable continues to decrease after $t_6$. A short time after $t_6$, the controlled variable reaches the minimum value, $c_2$, and then remains in a steady state at $c_2$. At this point the process has returned to an equilibrium state. Controller 18 observes and records the value $c_2$. Controller 18 then calculates (according to equation (9)) and stores the value $\Delta c_2$.

Dividing equation (8) into equation (6) yields equation (5), thereby showing that equation (5) is true for non-self-regulating processes. Note that the $\tau_1$ terms present in equations (6) and (8) cancel each other out. So $\tau_1$ need not be calculated prior to characterizing the controllable component. Therefore, according to the method of FIG. 1, since $c_0$, $c_1$ and $c_2$ have all been observed and stored, the parameter z can be solved according to equations (4) and (5).

Figure 5:
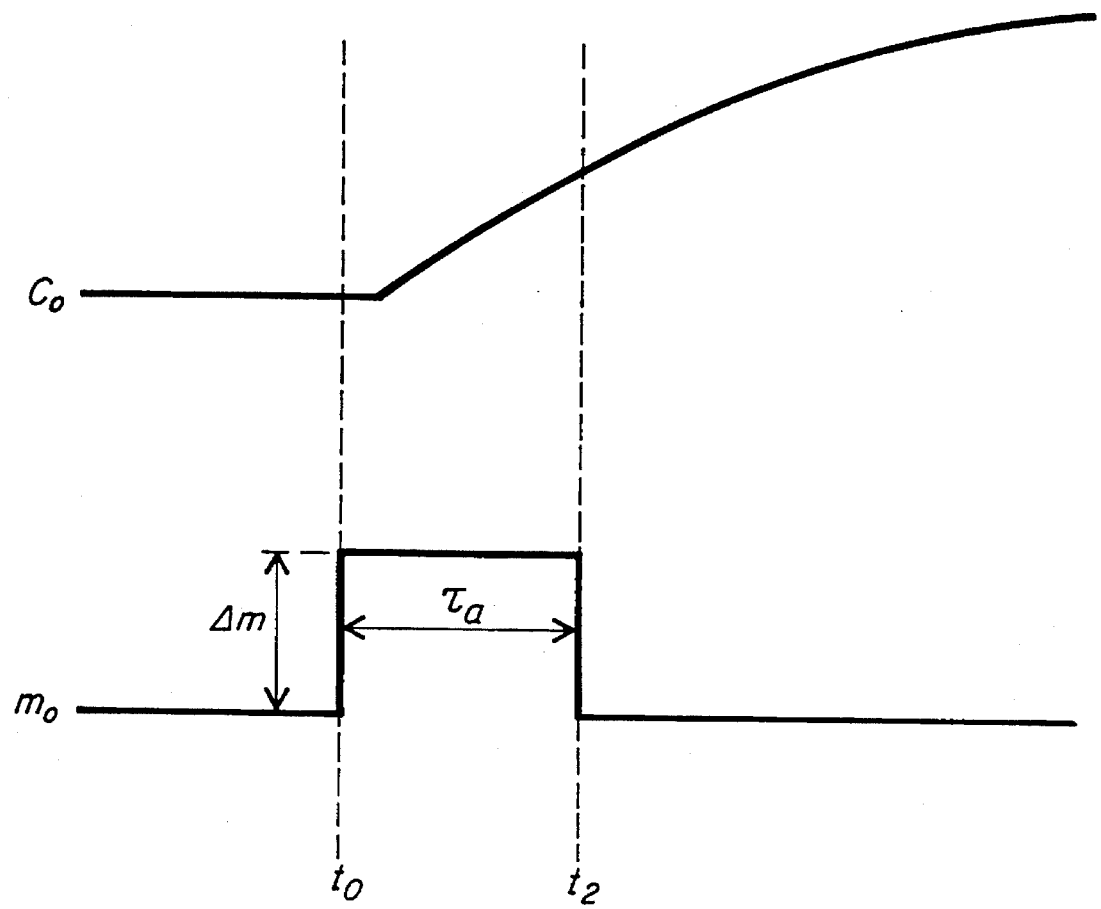
FIG. 5 is a timing diagram showing the behavior of the controlled variable when the controllable component is exhibiting dead-band in a non-self-regulating process.

FIG. 5 is a timing diagram showing the behavior of the controlled variable when the controllable component is exhibiting dead-band in a non-self-regulating process. After $t_2$, rather than assuming a steady state value, the controlled variable continues to diverge from the initial value, $c_0$. This continued divergence is indicative of dead-band. According to a preferred method of the invention, upon observing this divergence, controller 18 indicates to the operator that the controllable component is exhibiting dead-band and should be replaced.

Figure 6:
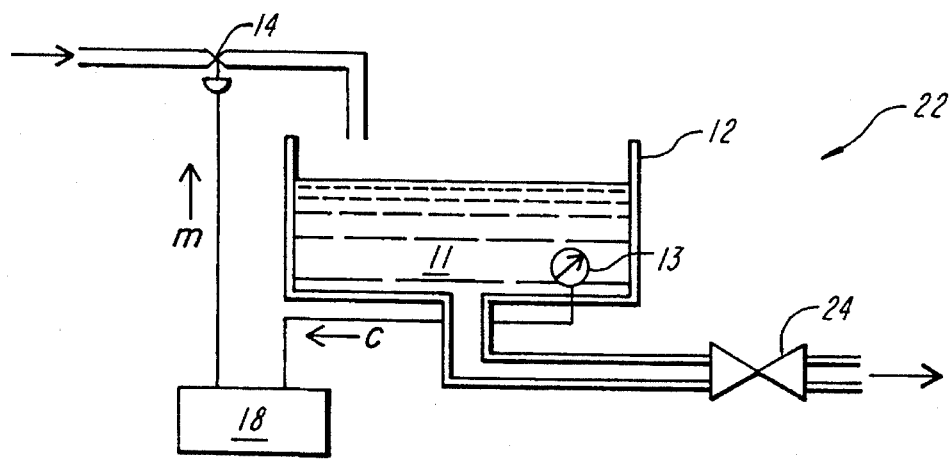
FIG. 6 depicts an exemplary self-regulating process amenable to analysis in accord with the invention.
Figure 5:
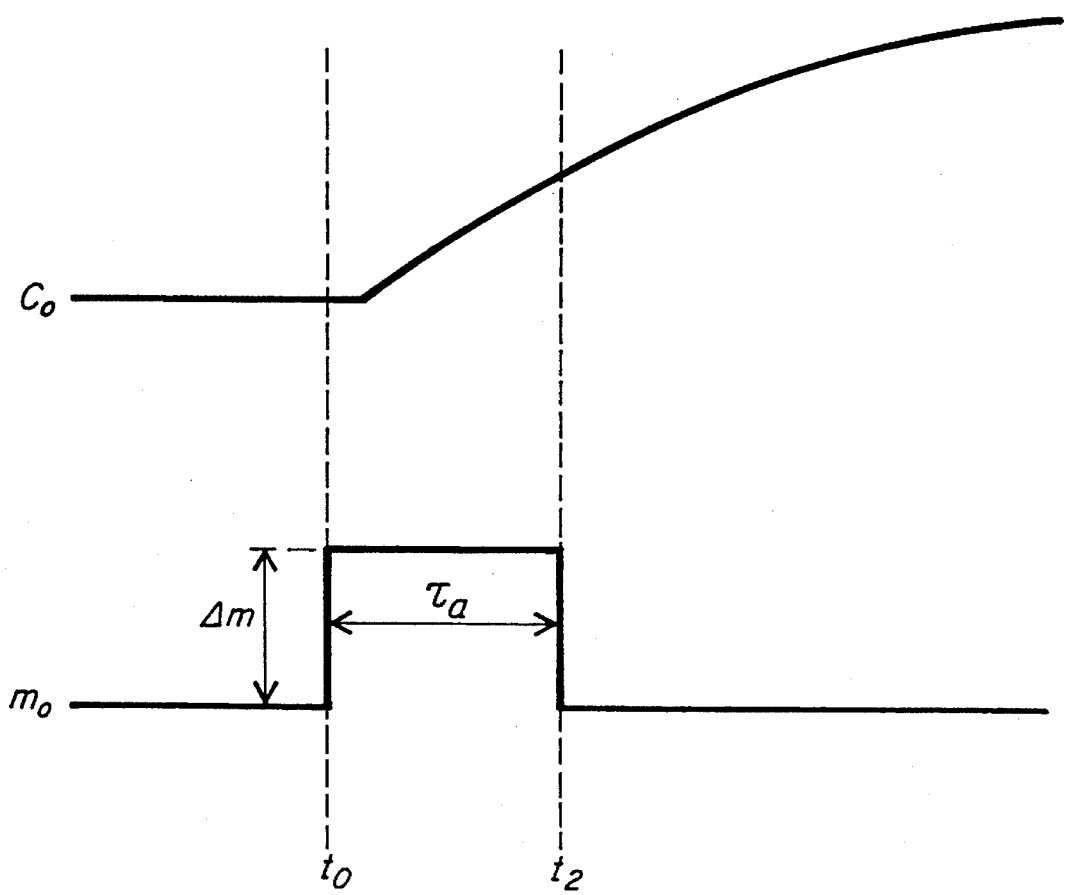
Figure 6:
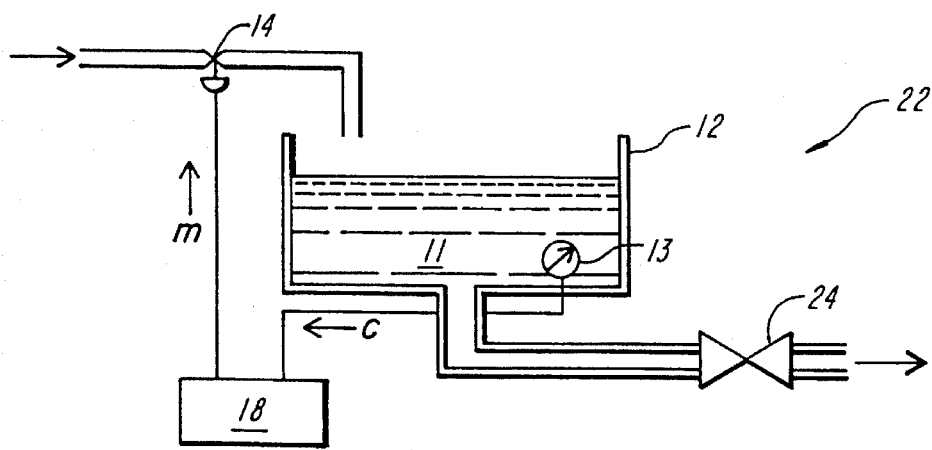

FIG. 6 shows an exemplary self-regulating process 22. Process 22 is identical to process 20 except metering pump 10 is replaced with an exit valve 24. Valve 24 behaves such that an increase in the level of fluid 11 in tank 12 will cause an increase in the outflow through valve 24. This action works towards restoration of equilibrium, and therefore the process is self-regulating.

Figure 7:
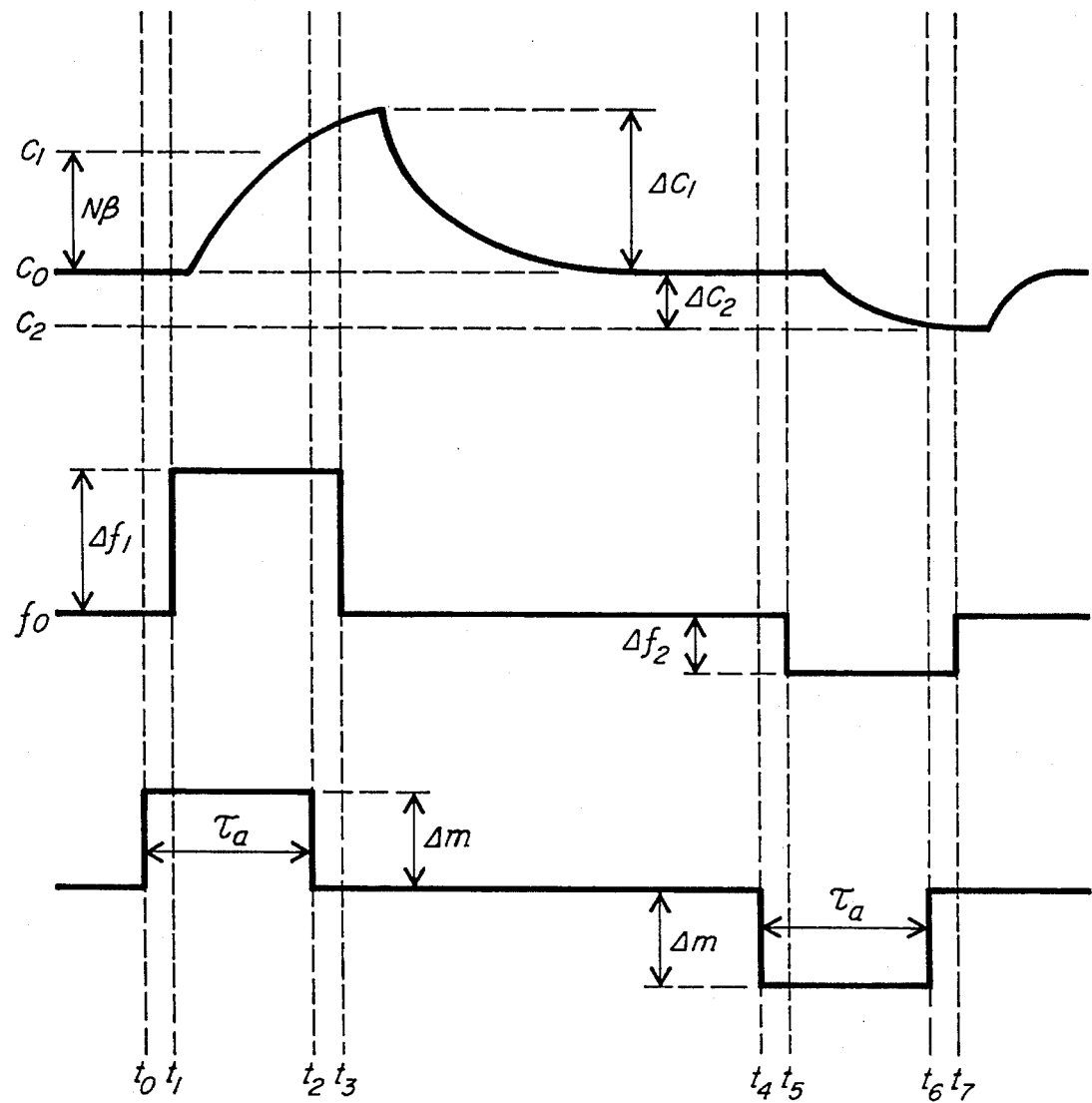
FIG. 7 is a timing diagram for a self-regulating process showing two pulses applied to the process, and the parameters that are observed to characterize a non-linear component according to a preferred method and apparatus of the invention.

FIG. 7 depicts a timing diagram, for self-regulating process 22, showing a time history of values of the manipulated variable when the controller is operated according to the method of FIG. 1, and the corresponding values of the flow output of valve 14 and the controlled variable. Prior to time $t_0$ controller 18 maintains the manipulated variable at an initial value, $m_0$, and this causes the flow output of valve 14 and the controlled variable to remain at initial values, $f_0$ and $c_0$, respectively. Prior to time $t_0$, controller 18 observes and records the value $c_o$.

Beginning at time $t_0$, controller 18 applies a first pulse to the process. At time $t_0$ controller 18 increases the manipulated variable, stepwise, by an amount $\Delta m$. This stepwise increase corresponds to increasing the opening of valve 14. After a short delay, at time $t_1$, this increase in the manipulated variable causes the flow output of valve 14 to increase by an amount $\Delta f_1$. Thus after time $t_1$, the flow into tank 12 (via valve 14) is greater than the flow out of tank 12 (via valve 24). Therefore, the level of fluid 11 in tank 12 begins to rise, and correspondingly the value of the controlled variable also begins to rise. Due to inherent delays in the process, there is some delay after $t_1$ before the controlled variable begins to increase.

Controller 18 maintains the manipulated variable at the increased value until the controlled variable changes by a predetermined amount, NB. Once the controlled variable changes by the amount NB, controller 18 records the time as $t_2$, and also records the length of the interval between $t_2$ and $t_0$ as $\tau_a$. At time $t_2$ controller 18 resets the manipulated variable, stepwise, to the initial value $m_0$, thus time $t_2$ marks the end of the first pulse.

During the first pulse, controller 18 maintains the manipulated variable at the increased value $m_0+\Delta m$, for a duration of $\tau_a$. The change in the controlled variable can be described analytically by the equation $$\Delta c_1 = k_p \Delta f_1 (1 - e^{-\frac{\tau_a}{\tau_1}}) \tag{10}$$

where $k_p$ is the gain of the process. The above-referenced related and co-pending United States Patent Application No. 07/889,427, now U.S. Pat. No. 5,341,288 also teaches a method for calculating the process gain $k_p$.

Again, $\Delta c_1$ can be described according to equation (7).

Because of delays inherent in the process, the value of the controlled variable continues to increase after $t_2$. A short time after $t_2$, the controlled variable reaches a maximum value, $c_1$, and then begins to decay towards the initial value $c_0$. Controller 18 observes and records the value $c_1$. Controller 18 then calculates (according to equation (7)) and stores the value $\Delta c_1$.

Since process 22 is self-regulating, the controlled variable will return to the value $c_0$ sometime after the end of the first pulse. After the controlled variable has decayed to the initial value, $c_0$, controller 18 applies a second pulse into the process. At time $t_4$ controller 18 decreases, stepwise, the manipulated variable by the amount $\Delta m$. This stepwise decrease corresponds to reducing the opening of valve 14. Thus after a short delay, at time $t_5$, the flow output from valve 14 decreases by an amount $\Delta f_2$. The flow into tank 12 is now less than the flow of fluid out of the tank via valve 24, therefore the fluid level begins to fall. Controller 18 maintains the manipulated variable at the decreased value $m_0-\Delta m$ for an interval of length $\tau_a$. Then at time $t_6$ controller 18 increases, stepwise, the manipulated variable by an amount $\Delta m$, thus ending the second pulse.

During the second pulse, the change in the controlled variable can be described analytically by the equation $$\Delta c_2 = k_p \Delta f_2 (1 - e^{-\frac{\tau_a}{\tau_1}}) \tag{11}$$

$\Delta c_2$ can be calculated according to equation (9),

Due to inherent delays in the process, the value of the controlled variable continues to decrease after $t_6$. A short time after $t_6$, the controlled variable reaches a minimum value, $c_2$, and then begins to decay towards the initial value $c_0$. Controller 18 observes and records the value $c_2$. Controller 18 then calculates (according to equation (9)) and stores the value $\Delta c_2$.

Dividing equation (11) into equation (10) yields equation (5), thereby showing that equation (5) is true for self-regulating processes. Note that the $k_p$ terms present in both equations (11) and (10) cancel each other out. So $k_p$ need not be calculated prior to characterizing the controllable component. Therefore, according to the method of FIG. 1, since $c_0$, $c_1$, and $c_2$ have all been observed and stored, the parameter z can be solved according to equations (4) and (5).

Figure 8:
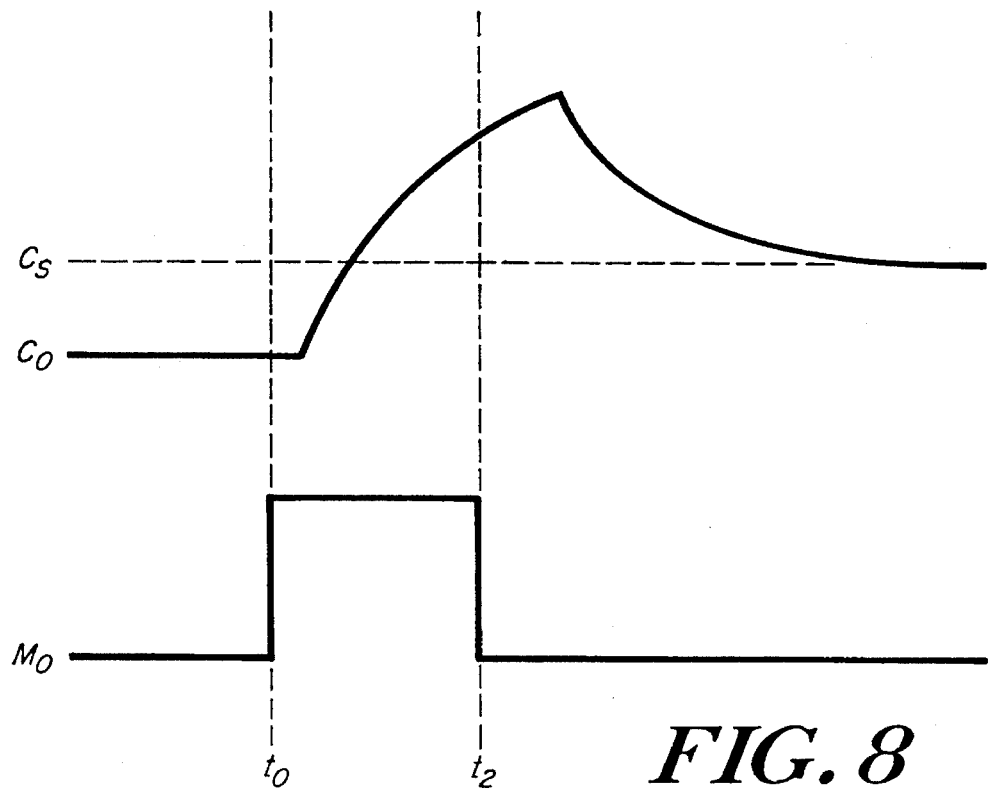
FIG. 8 is a timing diagram that graphically illustrates the behavior of the controlled variable when the controllable component is exhibiting dead-band in a self-regulating process.

FIG. 8 is a timing diagram showing a time history of values of the manipulated and controlled variables for a self-regulating process when the controllable component is exhibiting dead-band. After $t_2$, rather than decaying to the initial value, $c_0$, the controlled variable settles at a steady state value, $c_5$. According to a preferred method of the invention, upon observing the controllable component thil to return to $c_0$, controller 18 indicates to the operator that the controllable component is exhibiting dead-band and should be replaced.

The invention also provides another method for characterizing the non-linearity of a controllable component. In this method, as shown in FIG. 9, the controller applies two doublet pulses to the process, rather than applying two single pulses. FIG. 9 is a timing diagram for a self-regulating process showing a time history of values for the manipulated variable and the corresponding values of the flow output of valve 14 and the controlled variable.

As shown in FIG. 9, prior to time $t_{10}$ controller 18 maintains the manipulated variable at an initial value $m_0$. At $t_{10}$ controller 18 begins to generate the first doublet pulse. At time $t_{10}$ controller 18 increases the manipulated variable, stepwise, by an amount $\Delta m$. Controller 18 maintains the manipulated variable at the increased value, $m_0+\Delta m$, for a time interval of length $\tau_a$. The controlled variable increases in response to the increased value of the manipulated variable, and the length $\tau_a$ is determined as above by observing the length of time it takes for the controlled variable to change by a predetermined amount NB. At $t_{12}$ controller 18 decreases, stepwise, the manipulated variable by an amount $2\Delta m$ thus reducing the manipulated variable to the value $m_0-\Delta m$. Controller 18 maintains the manipulated variable at the decreased value for an interval of length $\tau_a$, and then at time $t_{14}$ controller 18 increases, stepwise, the manipulated variable by an amount $\Delta_m$, thus returning the manipulated variable to the initial value $m_0$ and ending the first doublet pulse.

Due to inherent delays in the system, the controlled variable continues to increase for a period after $t_{12}$. Some time between $t_{12}$ and $t_{14}$ the controlled variable will attain a maximum value, $c_6$. Controller 18 observes and records the value $c_6$. Again, due to inherent delays, the controlled variable continues to decrease after $t_{14}$, and reaches a minimum value $c_7$ before it begins to decay towards the initial value $c_0$. Controller 18 observes and records the value $c_7$.

After the controlled variable has returned to the initial value $c_0$, at time $t_{16}$ controller 18 applies a second doublet pulse. The second doublet pulse is reversed in orientation from the first pulse; it begins with a decreasing step whereas the first doublet pulse began with an increasing step. At time $t_{16}$ controller 18 decreases, stepwise, the manipulated variable by an amount $\Delta m$. Controller 18 maintains the manipulated variable at the decreased value for an interval of length $\tau_1$, and then at time $t_{18}$ controller 18 increases the manipulated variable by an amount $2\Delta m$. Controller 18 maintains the manipulated variable at the increased value for an interval of length $\tau_a$, and then at time $t_{20}$ decreases, stepwise, the manipulated variable by an amount $\tau m$, thus returning the manipulated variable to the original value $m_0$ and ending the second doublet pulse. Controller 18 observes and stores the minimum and maximum values, $c_8$ and $c_9$ attained by the controlled variable after $t_{18}$ and $t_{20}$, respectively.

The parameter, z, can then be solved in terms of $c_0$, $c_6$, $c_7$, $c_8$ and $c_9$ according to equation (4) and to the equation $$v = \frac{\frac{(c_8 - c_0)}{(c_6 - c_0)} - \left(1 - \frac{c_9 - c_0}{c_8 - c_0}\right)}{1 - \frac{(c_8 - c_0)}{(c_6 - c_0)} - \left(1 - \frac{c_7 - c_0}{c_6 - c_0}\right)} \quad (12)$$

Figure 10:
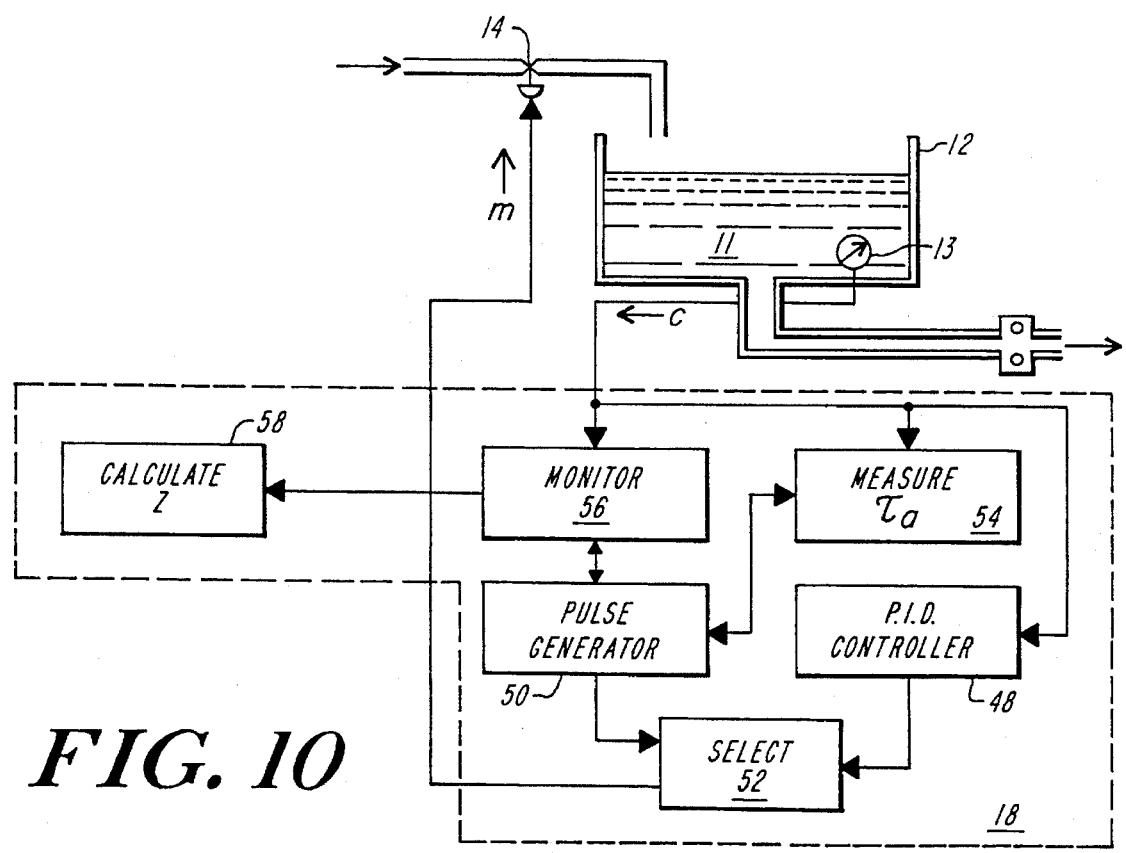
FIG. 10 shows in detail a preferred controller constructed according to the invention.

FIG. 10 shows in detail a preferred controller constructed according to the invention. The controlled variable signal, c, output of transducer 13, is indicative of the level of fluid 11 in tank 12. The controlled variable is input to controller 48 which in a preferred embodiment is a proportional, integral, derivative (PID) controller. The output of such a PID controller is a weighted sum of an error signal, and that error signal's time derivative and time integral. The error signal is a difference between the controlled variable and a desired operating value. Such PID controllers are well known in the art.

During normal operation of the process control system, the output of PID controller 48 is fed to the input of valve 14. However, to characterize non-linear valve 14 by a method according to the invention, a series of pulses must be fed to the input of valve 14 rather than the weighted error signal which is produced by PID controller 48.

Pulse generator 50 generates the pulses necessary for characterizing a non-linear component. When a non-linear component is being characterized, selector 52 couples pulse generator 50 to the input of valve 14 (during normal operation, selector 52 couples PID controller 48 to valve 14).

The pulses generated by pulse generator 50 are of length $\tau_a$. Measuring mechanism 54 measures and stores the length of $\tau_a$. When pulse generator 50 applies the first pulse to a process (in accord with any of the above-described methods for characterizing non-linear components) pulse generator 50 also sends a signal to mechanism 54 indicating that the first pulse has begun. Mechanism 54 determines the length of $\tau_a$ as the time between the beginning of the first pulse and the instant that the controlled variable changes from its initial value, $c_0$, by an amount NB.

Monitoring mechanism 56 measures the changes in the controlled variable and in particular measures $\Delta c_1$, $\Delta c_2$, $c_6$, $c_7$, $c_8$ and $c_9$. Monitoring mechanism 56 also signals pulse generator 50 when the controlled variable has returned to its initial value, $c_0$. When components of self-regulating systems are being characterized, pulse generator 50 waits for this signal before beginning the second pulse.

Calculating mechanism 58 calculates the value for the parameter, z, using the values observed and stored by monitoring mechanism 56.

Those skilled in the art will appreciate that PID controller 48, pulse generator 50, selector 52, measuring mechanism 54, monitoring mechanism 56, and calculating mechanism 58 can be implemented in software residing on a digital computer or alternatively can be implemented in dedicated hardware.

Once a value of z has been chosen that characterizes the non-linearity of the controllable component, it is desirable to compensate for the non-linearity. As can be seen from FIG. 2, for all values of z greater than 0.0, the two curves parameterized by the values z and 1/z are mirror images of each other. The 1/z curve is the reflection of the z curve taken about the linear (z=1) curve. Therefore, a multiplicative factor of 1/z is the appropriate compensator for any component characterized by the parameter z. Note that if the component is linear, no compensation is necessary, and the compensator generated by this method is a multiplicative factor of unity. Therefore, this method can be used for components whether they are linear or non-linear.

This method of choosing a compensator of value 1/z can be used whether the process is self-regulating or non-self-regulating. Generally, a controller generates the manipulated variable signal which is fed to the input of the non-linear component. A compensator of 1/z introduced between the controller and the non-linear component will make the component appear to respond linearly from the reference of the controller.

Figure 11:
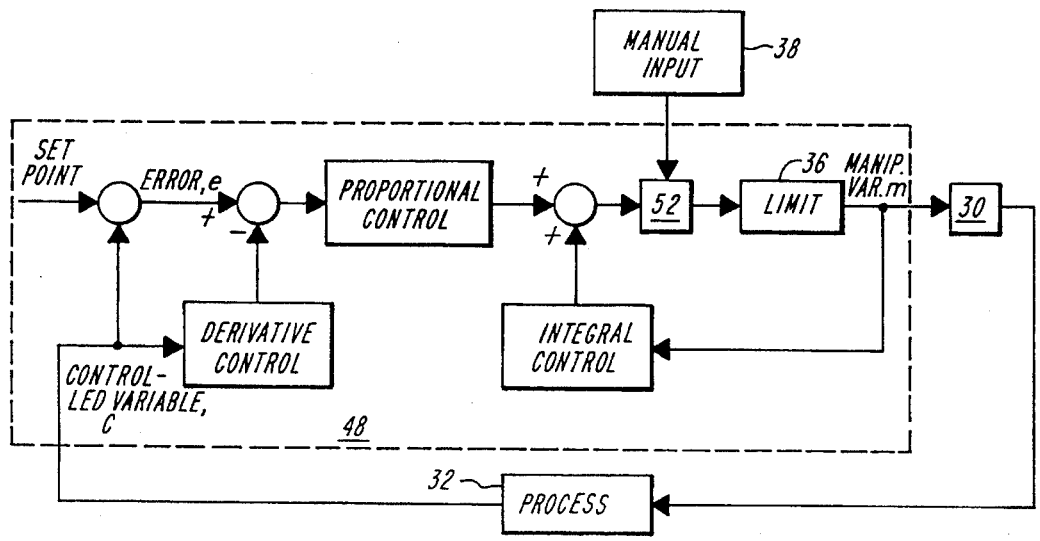
FIG. 11 shows a preferred controller according to the invention, coupled to a controllable component and a process.

FIG. 11 shows PID controller 48 in detail and coupled to a controllable component 30 and a process 32. The error signal used by PID controller 48 is the difference between the controlled variable and the "SET POINT" which corresponds to a desired operating point.

Selector 52 selects between the PID signal generated from the error signal, and a manual input 38. Manual input 38 is understood to represent a generic input, and could be signals generated by a human operator, or could represent other, automatically generated, signals, such as pulses generated by pulse generator 50 (as shown in FIG. 10).

LIMIT box 36 generates an output that is essentially identical to its input, except that LIMIT box 36 places high and low limits on the output and thereby limits the range of the manipulated variable. LIMIT box 36 thus maintains the manipulated variable within the operating range of component 30.

Figure 12:
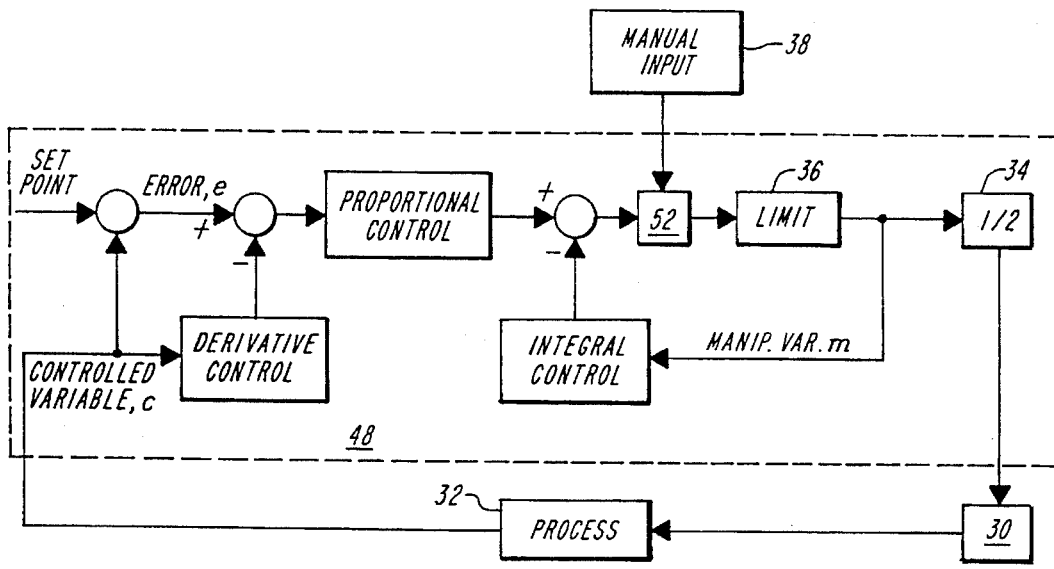
FIG. 12 shows an arrangement for inserting a linearizing compensator into a process according to one embodiment the invention.

FIG. 12 illustrates one method for introducing a 1/z compensator 34 into a process. In FIG. 12, compensator 34 is positioned between the LIMIT box and the component 30. This arrangement does linearize component 30 from the perspective of controller 48. However, positioning compensator 34 between the LIMIT box 36 and component 30 has the disadvantage that even when manual input 38 is selected, an operator can not explicitly set the level of operation for component 30. The 1/z compensator 34 will always shift the signal output from the LIMIT box.

Figure 13:
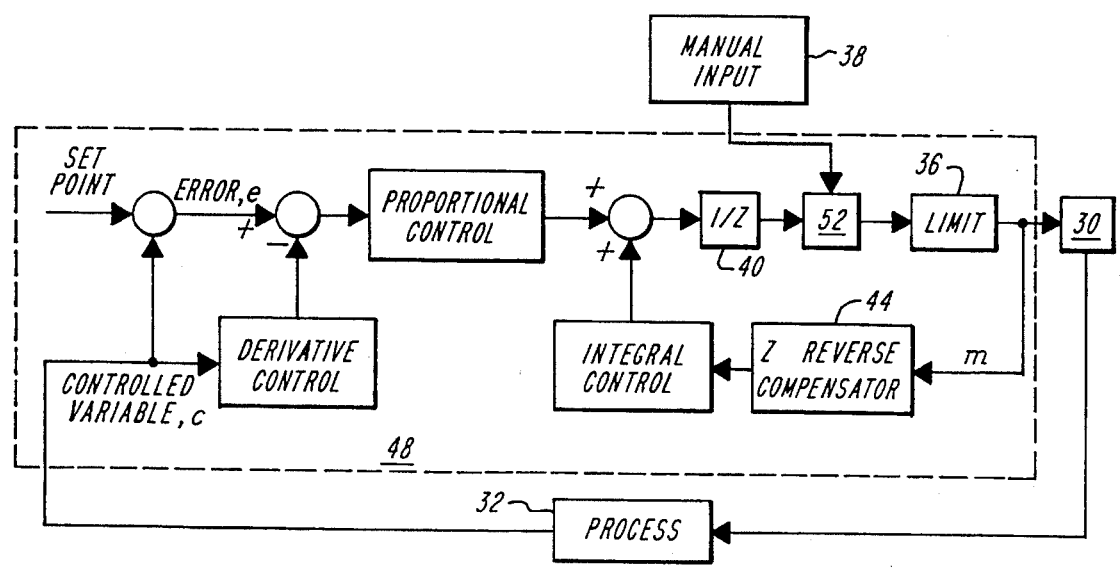
FIG. 13 shows another arrangement for inserting a linearizing compensator into a process according to a preferred embodiment of the invention.

FIG. 13 illustrates a preferred embodiment for introducing a 1/z compensator 40 into a process which overcomes this limitation. In FIG. 13, the 1/z compensator 40 is positioned between the PID signal and LIMIT box 36. Therefore, when selector 52 selects manual input 38, the manually input signals directly affect the component 30. However, since the 1/z compensator 40 is introduced in the integral feedback loop, an additional reverse compensator 44, which multiplies its input by a function of z, must be introduced between LIMIT box 36 and the integrator so as not to offset the integral portion of the PID controller 48.

Once a value of z is chosen for the compensator the controller should be initialized so that activation of the compensator will not jolt the process. Before a new value of z is installed in the compensator, the controller examines the current value of the manipulated variable, and "back-calculates" the value of the input that would generate that same manipulated variable value with the new value of z installed in the compensator. The controller then simultaneously installs the new value of z in the compensator and adjusts the input accordingly so that the process continues to operate smoothly.

Described above are methods and apparatus for characterizing non-linear components of process control systems. Those skilled in the art will appreciate that these meet the desired objects by applying a series of pulses to the process, observing the response of the process, and parameterizing the non-linearity based on those observations.

Those skilled in the art will appreciate that the illustrated embodiment is exemplary, and that other embodiments incorporating additions and modifications to that described above fall within the scope of the invention.

In view of the foregoing, what I claim is:

1. A method of determining a non-linear characteristic, z, of a self-regulating process that is controlled by application of a manipulated variable signal thereto for varying a first characteristic thereof, and that generates a controlled variable signal representative of that first characteristic, the method comprising the steps of:

A. applying a first pulse to the process by
      i) incrementing the manipulated variable signal stepwise from an original value, $m_0$, a predetermined amount, $\Delta m$, for causing the controlled variable signal to change from an original value, $c_0$,
      ii) monitoring the controlled variable signal to determine a length of a time interval, $\tau_a$, beginning substantially when the manipulated variable is incremented and ending substantially when the controlled variable signal changes from the original value, $c_0$, by a predetermined amount, NB,
      iii) responding to the controlled variable signal changing by said predetermined amount, NB, by decrementing the manipulated variable signal stepwise to substantially the original value, $m_0$, thereby causing the controlled variable signal to return substantially to the original value, $c_0$, and by monitoring the controlled variable signal during a first time interval beginning at said stepwise decrementing and ending when said controlled variable returns to the original value, $c_0$, for measuring a distance, $\Delta c_1$, between the initial value, $c_0$, and a value achieved by the controlled variable signal during said first time interval that is maximally distant from the initial value, $c_0$, B. applying a second pulse to the process by,
      i) after the controlled variable signal returns to the original value, $c_0$, decreasing the manipulated variable signal stepwise from the original value, $m_0$, by the predetermined amount $\Delta m$, and
      ii) at a time substantially $\tau_a$ after said decreasing, increasing the manipulated variable signal stepwise to substantially the original value, $m_0$, thereby causing the controlled variable signal to return substantially to the original value, $c_0$, and monitoring the controlled variable signal during a second time interval beginning at said stepwise increasing and ending when the controlled variable signal returns substantially to the original value, $c_0$, for measuring a distance, $\Delta c_2$, between the initial value, $c_0$, and a value achieved by the controlled variable signal during said second time interval that is maximally distant from the initial value, $c_0$, and C. determining the non-linearity, z, of the process as a function of the distances, $\Delta c_1$ and $\Delta c_2$.

2. A method according to claim 1, wherein said determining step includes the steps of estimating the non-linearity, z, as a function of a mathematical expression $$z = \frac{v(a-b) + b - d}{vd(b-a) - a(b-d)}$$

where, $$a = \frac{100}{m_0 - \Delta m} - 1, b = \frac{100}{m_0} - 1,$$

$$d = \frac{100}{m_0 + \Delta m} - 1, v = \frac{\Delta c_1}{\Delta c_2}.$$

3. A method according to claim 1, including the steps of
   A. monitoring the controlled variable signal after the manipulated variable signal is decremented to the original value, $m_0$, and
   B. responding to a determination that the controlled variable signal reaches a steady state value other than the original value, $c_0$, by generating a signal indicating a presence of dead-band in the process.

4. A method of determining a non-linear characteristic, z, of a self-regulating process that is controlled by application of a manipulated variable signal thereto for varying a first characteristic thereof, and that generates a controlled variable signal representative of that first characteristic, the method comprising the steps of:

A. applying a first pulse to the process by
      i) incrementing the manipulated variable signal stepwise from an original value, $m_0$, a predetermined amount, $\Delta m$, for causing the controlled variable signal to change from an original value, $c_0$,
      ii) monitoring the controlled variable signal and responding to the controlled variable signal changing by said predetermined amount, NB, by decrementing the manipulated variable signal stepwise to substantially the original value, $m_0$,
   B. monitoring the controlled variable signal after such decrementing, and
   C. responding to the controlled variable signal reaching a steady state value other than the original value, $c_0$, by generating a signal indicating the presence of dead band in the process.

5. An apparatus for determining a non-linear characteristic, z, of a self-regulating process that is controlled by application of a manipulated variable signal thereto for varying a first characteristic thereof, and that generates a controlled variable signal representative of that first characteristic, the apparatus comprising:

A. pulse means, coupled with the process, for generating as said manipulated variable signal a pulsed waveform, and for applying that pulsed waveform to said process,
   B. monitoring means, coupled with the process, for monitoring a time-wise change in the controlled variable signal during application of said pulsed waveform, and for generating a delta signal representative thereof, C. analysis means, coupled with said monitoring means, for responding to said delta signal to generate a parameter signal representative of the non-linear characteristic, z, of the process, said parameter signal being generated as a function of said time-wise change in the controlled variable signal during application of the pulsed waveform.

6. An apparatus according to claim 5, wherein said pulse means comprises
   A. upward pulse means for generating, as a component of said pulsed waveform, an upward pulse, said upward pulse means including means for successively
      i) generating a waveform that begins at an original value, $m_0$,
      ii) increasing the waveform stepwise a predetermined amount, $\Delta m$, for causing the controlled variable signal to change from an original value, $c_0$,
      iii) maintaining the waveform at the increased value for a time interval substantially of length $\tau_a$, and
      iv) decreasing the waveform stepwise to substantially the original value, $m_0$, and
   B. downward pulse means for generating, as a component of said pulsed waveform, a downward pulse, said downward pulse means including means for successively
      i) maintaining the waveform at the original value, $m_0$, until said monitoring means indicates that the controlled variable signal has returned substantially to the original value $c_0$,
      ii) decrementing the waveform stepwise the predetermined amount $\Delta m$,
      iii) maintaining the waveform at the decremented value for a time interval substantially of the length $\tau_a$, and
      iv) incrementing the waveform stepwise to substantially the original value, $m_0$.

7. An apparatus according to claim 6, wherein said upward pulse means includes time measuring means for determining the length $\tau_a$ by measuring a time interval between
   i) the stepwise increase of the waveform from the original value, $m_0$, and
   ii) a time that the controlled variable signal changes from its original value $c_0$ by a predetermined amount, NB.

8. An apparatus according to claim 7, wherein said monitoring means includes means for measuring a distance, $\Delta c_1$, between the initial value, $c_0$, and a value achieved by the controlled variable signal, during a first time interval, maximally distant from the initial value, $c_0$, and means for measuring a distance, $\Delta c_2$, between the initial value, $c_0$, and a value achieved by the controlled variable signal, during a second time interval, maximally distant from the initial value, $c_0$, wherein said first time interval begins substantially at said stepwise decreasing and ends substantially when said controlled variable signal returns substantially to the initial value, $c_0$, and wherein said second time interval begins substantially at said stepwise incrementing and ends substantially when said controlled variable signal returns substantially to said initial value, $c_0$.

9. An apparatus according to claim 8, wherein said analysis means includes an estimating means for estimating the non-linearity, z, as a function of a mathematical expression $$z = \frac{v(a-b)+b-d}{vd(b-a)-a(b-d)}$$

where, $$a = \frac{100}{m_0 - \Delta m} - 1, b = \frac{100}{m_0} - 1,$$

$$d = \frac{100}{m_0 + \Delta m} - 1, v = \frac{\Delta c_1}{\Delta c_2}$$

10. An apparatus according to claim 6, wherein said analysis means includes a detecting means for detecting whether the controlled variable signal reaches a steady state value other than the original value, $c_0$, after the pulsed waveform is decreased to the original value, $m_0$, and for generating a signal indicating a presence of dead-band in the process based on such detection.

11. A method of determining a non-linear characteristic, z, of a non-self-regulating process that is controlled by application of a manipulated variable signal thereto for varying a first characteristic thereof, and that generates a controlled variable signal representative of that first characteristic, the method comprising the steps of:
    A. applying a first pulse to the process by
       i) incrementing the manipulated variable signal stepwise from an original value, $m_0$, a predetermined amount, $\Delta m$, for causing the controlled variable signal to change from an original value, $c_0$,
       ii) monitoring the controlled variable signal to determine a length of a time interval, $\tau_a$, beginning substantially when the manipulated variable is incremented and ending substantially when the controlled variable signal changes from the original value, $c_0$, by a predetermined amount, NB,
       iii) responding to the controlled variable signal changing by said predetermined amount, NB, by decrementing the manipulated variable signal stepwise to substantially the original value, $m_0$, and by monitoring the controlled variable signal for measuring a distance, $\Delta c_1$, between the initial value, $c_0$, and a steady state value, $c_1$, reached by the controlled variable signal after said stepwise decrementing,
    B. applying a second pulse to the process by,
       i) after a predetermined time interval, decreasing the manipulated variable signal stepwise from the original value, $m_0$, by the predetermined amount $\Delta m$, and
       ii) at a time substantially $\tau_a$ after said decreasing, increasing the manipulated variable signal stepwise to substantially the original value, $m_0$, and monitoring the controlled variable signal for measuring a distance, $\Delta c_2$, between said steady state value, $c_1$, and a steady state value achieved by the controlled variable after said stepwise increasing, and
    C. determining the non-linearity, z, of the process as a function of the distances, $\Delta c_1$ and $\Delta C_2$.

12. A method according to claim 11, wherein said determining step includes the steps of estimating the non-linearity, z, as a function of a mathematical expression $$z = \frac{v(a-b)+b-d}{vd(b-a)-a(b-d)}$$

where, $$a = \frac{100}{m_0 - \Delta m} - 1, b = \frac{100}{m_0} - 1,$$

$$d = \frac{100}{m_0 + \Delta m} - 1, v = \frac{\Delta c_1}{\Delta c_2}$$

13. A method according to claim 11, including the steps of
   A. monitoring the controlled variable signal after the manipulated variable signal is decremented to the original value, $m_0$, and
   B. responding to a determination that the controlled variable signal fails to reach a steady state value by generating a signal indicating a presence of dead-band in the process.

14. A method of determining a non-linear characteristic, z, of a non-self-regulating process that is controlled by application of a manipulated variable signal thereto for varying a first characteristic thereof, and that generates a controlled variable signal representative of that first characteristic, the method comprising the steps of:
   A. applying a first pulse to the process by
      i) incrementing the manipulated variable signal stepwise from an original value, $m_0$, a predetermined amount, $\Delta m$, for causing the controlled variable signal to change from an original value, $c_0$,
      ii) monitoring the controlled variable signal and responding to the controlled variable signal changing by said predetermined amount, NB, by decrementing the manipulated variable signal stepwise to substantially the original value, $m_0$,
   B. monitoring the controlled variable signal after such decrementing, and
   C. responding to the controlled variable signal failing to reach a steady state value by generating a signal indicating the presence of dead band in the process.

15. An apparatus for determining a non-linear characteristic, z, of a non-self-regulating process that is controlled by application of a manipulated variable signal thereto for varying a first characteristic thereof, and that generates a controlled variable signal representative of that first characteristic, the apparatus comprising:
   A. pulse means, coupled with the process, for generating as said manipulated variable signal a pulsed waveform, and for applying that pulsed waveform to said process,
   B. monitoring means, coupled with the process, for monitoring a time-wise change in the controlled variable signal during application of said pulsed waveform, and for generating a delta signal representative thereof,
   C. analysis means, coupled with said monitoring means, for responding to said delta signal to generate a parameter signal representative of the non-linear characteristic, z, of the process, said parameter signal being generated as a function of said time-wise change in the controlled variable signal during application of the pulsed waveform.

16. An apparatus according to claim 15, wherein said pulse means comprises
   A. upward pulse means for generating, as a component of said pulsed waveform, an upward pulse, said upward pulse means including means for successively
      i) generating a waveform that begins at an original value, $m_0$,
      ii) increasing the waveform stepwise a predetermined amount, $\Delta m$, for causing the controlled variable signal to change from an original value, $c_0$,
      iii) maintaining the waveform at the increased value for a time interval substantially of length $\tau_a$, and
      iv) decreasing the waveform stepwise to substantially the original value, $m_0$, and
   B. downward pulse means for generating, as a component of said pulsed waveform, a downward pulse, said downward pulse means including means for successively
      i) maintaining the waveform at the original value, $m_0$, for a predetermined time interval
      ii) decrementing the waveform stepwise the predetermined amount $\Delta m$,
      iii) maintaining the waveform at the decremented value for a time interval substantially of the length $\tau_a$, and
      iv) incrementing the waveform stepwise to substantially the original value, $m_0$.

17. An apparatus according to claim 16, wherein said upward pulse means includes time measuring means for determining the length $\tau_a$, by measuring a time interval between
   i) the stepwise increase of the waveform from the original value, $m_0$, and
   ii) a time that the controlled variable signal changes from its original value $c_0$ by a predetermined amount, NB.

18. An apparatus according to claim 17, wherein said monitoring means includes means for measuring a distance, $\Delta c_1$, between the initial value, $c_0$, and a steady state value, $c_1$, achieved by the controlled variable signal after said stepwise decreasing, and means for measuring a distance, $\Delta c_2$, between said steady state value, $c_1$, and a steady state value achieved by the controlled variable signal after said stepwise incrementing.

19. An apparatus according to claim 18, wherein said analysis means includes an estimating means for estimating the non-linearity, z, as a function of a mathematical expression $$z = \frac{v(a-b) + b - d}{vd(b-a) - a(b-d)}$$

where, $$a = \frac{100}{m_0 - \Delta m} - 1, b = \frac{100}{m_0} - 1,$$

$$d = \frac{100}{m_0 + \Delta m} - 1, v = \frac{\Delta c_1}{\Delta c_2}$$

20. An apparatus according to claim 16, wherein said analysis means includes a detecting means for detecting whether the controlled variable signal fails to reach a steady state value after said stepwise decreasing, and for generating a signal indicating a presence of dead-band in the process based on such detection.

21. A method of determining a non-linear characteristic, z, of a self-regulating process that is controlled by application of a manipulated variable signal thereto for varying a first characteristic thereof, and that generates a controlled variable signal representative of that first characteristic, the method comprising the steps of:
   A. applying a first doublet pulse to the process by
      i) incrementing the manipulated variable signal stepwise from an original value, $m_0$, a predetermined amount, $\Delta m$, for causing the controlled variable signal to change from an original value, $c_0$,
      ii) monitoring the controlled variable signal to determine a length of a time interval, $\tau_a$, beginning substantially when the manipulated variable is incremented and ending substantially when the controlled variable signal changes from the original value, $c_0$, by a predetermined amount, NB,
      iii) responding to the controlled variable signal changing by said predetermined amount, NB, by decrementing the manipulated variable signal stepwise by twice the amount $\Delta m$ thereby beginning a second half of said first doublet pulse, iv) at a time substantially $\tau_a$ after the beginning of the second half of said first doublet pulse, incrementing the manipulated variable signal stepwise by the amount $\tau m$ thereby returning the manipulated variable signal substantially to the initial value, $m_0$, and ending the first doublet pulse, v) monitoring the controlled variable signal during the second half of said first doublet pulse for measuring $c_6$, a value achieved by the controlled variable signal maximally distant from the initial value, $c_0$, vi) monitoring the controlled variable signal during a first period beginning after the end of the first doublet pulse and ending after the controlled variable signal returns to the original value $c_0$, for measuring $c_7$, a value achieved by the controlled variable signal during said first period maximally distant the initial value, $c_0$, B. applying a second doublet pulse to the process by, i) after the controlled variable signal returns to the original value, $c_0$, decreasing the manipulated variable signal stepwise from the original value, $m_0$, by the predetermined amount $\Delta m$, ii) at a time substantially $\tau_a$ after said decreasing, increasing the manipulated variable signal stepwise by twice the amount $\Delta m$ thereby beginning a second half of said second doublet pulse, iii) at a time substantially $\tau_a$ after the beginning of the second half of said second doublet pulse, decreasing the manipulated variable signal stepwise by the amount $\Delta m$ thereby returning the manipulated variable signal substantially to the initial value, $m_0$, and ending the second doublet pulse, iv) monitoring the controlled variable signal during the second half of said first doublet pulse for measuring $c_8$, a value achieved by the controlled variable signal maximally distant from the initial value, $c_0$, v) monitoring the controlled variable signal during a second period beginning after the end the second doublet pulse and ending after the controlled variable signal returns to the original value $c_0$, for measuring $c_9$, a value achieved by the controlled variable signal during said second period maximally distant from the initial value, $c_0$, C. determining the non-linearity, z, of the process as a function of the values, $c_6$, $c_7$, $c_8$, and $c_9$.

22. A method according to claim 21, wherein said determining step includes the steps of estimating the non-linearity, z, as a function of a mathematical expression $$z = \frac{v(a-b)+b-d}{vd(b-a)-a(b-d)}$$

where, $$a = \frac{100}{m_0 - \Delta m} - 1, \quad b = \frac{100}{m_0} - 1,$$

$$d = \frac{100}{m_0 + \Delta m} - 1,$$

$$v = \frac{\frac{(c_8-c_0)}{(c_6-c_0)} - \left(1 - \frac{c_9-c_0}{c_8-c_0}\right)}{1 - \frac{(c_8-c_0)}{(c_6-c_0)} - \left(1 - \frac{c_7-c_0}{c_6-c_0}\right)}$$

* * * * *